United States Patent
Auperin

(10) Patent No.: US 12,552,499 B2
(45) Date of Patent: Feb. 17, 2026

(54) METHOD AND SYSTEM FOR TENSIONING A HYPERSTATIC SYSTEM

(71) Applicant: SAIPEM S.A., Montigny le Bretonneux (FR)

(72) Inventor: Mathieu Auperin, Versailles (FR)

(73) Assignee: SAIPEM S.A., Montigny le Bretonneux (FR)

( * ) Notice: Subject to any disclaimer, the term of this patent is extended or adjusted under 35 U.S.C. 154(b) by 456 days.

(21) Appl. No.: 17/927,467

(22) PCT Filed: May 6, 2021

(86) PCT No.: PCT/FR2021/050781
§ 371 (c)(1),
(2) Date: Nov. 23, 2022

(87) PCT Pub. No.: WO2021/240089
PCT Pub. Date: Dec. 2, 2021

(65) Prior Publication Data
US 2023/0242223 A1  Aug. 3, 2023

(30) Foreign Application Priority Data
May 25, 2020 (FR) ...................................... 2005466

(51) Int. Cl.
*B63B 35/44* (2006.01)
*B63B 77/10* (2020.01)
*F03D 13/25* (2016.01)

(52) U.S. Cl.
CPC .............. *B63B 35/44* (2013.01); *B63B 77/10* (2020.01); *F03D 13/25* (2016.05);
(Continued)

(58) Field of Classification Search
CPC . F03D 13/256; F03D 13/25; B63B 2035/446; B63B 35/44
See application file for complete search history.

(56) References Cited

U.S. PATENT DOCUMENTS 11,383,799 B2   7/2022  Colmard et al.
2010/0232886 A1*  9/2010  Riha .................... B63B 21/502
                                           405/223.1
2020/0391834 A1   12/2020  Colmard et al.

FOREIGN PATENT DOCUMENTS

EP   1348867 A1   10/2003
EP   3587238 A1   1/2020
(Continued)

OTHER PUBLICATIONS

Search Report from French Application No. 2005466, Mar. 16, 2021.

*Primary Examiner* — Sean D Andrish
(74) *Attorney, Agent, or Firm* — Workman Nydegger

(57) ABSTRACT

A method and system for tensioning a hyperstatic system involves two structures connected to each other, including: a) connecting, by at least one non-adjustable tendon and at least one adjustable tendon which is formed by a tendon coupled to a cylinder in an initially retracted position, an upper structure to a lower structure which is positioned below the upper structure while maintaining zero tension in the tendons; step b) applying a force to the upper structure and/or the lower structure in order to tension each adjustable tendon and to deploy the respective cylinder thereof, the tension of each non-adjustable tendon remaining at zero; and step c) progressively increasing the force until the tension of each non-adjustable tendon reaches a threshold value which brings about a load transfer from the lower structure to the upper structure to allow the lower structure to be supported by the upper structure.

17 Claims, 4 Drawing Sheets

(52) U.S. Cl.
CPC ..... *B63B 2035/446* (2013.01); *B63B 2241/08* (2013.01); *B63B 2241/12* (2013.01); *F05B 2240/93* (2013.01); *F05B 2240/95* (2013.01)

(56) References Cited

FOREIGN PATENT DOCUMENTS

| WO | | 2005118963 | A2 | | 12/2005 |
|----|----|----|----|----|----|
| WO | WO | 2009064737 | | * | 5/2009 |
| WO | | 2011083021 | A2 | | 7/2011 |
| WO | | 2016207427 | A1 | | 12/2016 |
| WO | | 2019106283 | A1 | | 6/2019 |

\* cited by examiner

METHOD AND SYSTEM FOR TENSIONING A HYPERSTATIC SYSTEM

TECHNICAL FIELD

The invention relates to the general field of tensioning a hyperstatic system composed of two structures connected to each other by tendons.

PRIOR ART

An offshore wind turbine aims at using the energy of the wind to produce electricity through a turbine and an electric generator. There are two main types of offshore wind turbines: fixed wind turbines which are installed on the seabed (at shallow depths typically less than 50 m), and floating wind turbines which offer the advantage of being able to be built on land and anchored in areas where the depth of the seabed typically exceeds 50 m.

Floating wind turbines comprise a turbine generally formed by a motor with several rotating blades with a horizontal axis and an electric generator coupled to the motor, the motor and the generator being fixed to an upper end of a vertical mast (or pylon). The lower end of the mast is mounted on a floating support structure (or float).

More specifically, some offshore wind turbines to which the invention applies comprise a floating support structure having a float intended to be partly submerged and on which a wind turbine mast is intended to be assembled, and a counterweight connected to the float by a plurality of retaining tendons and intended to be submerged under the float.

For example, reference may be made to publication WO 2019/106283 which describes an offshore wind turbine float which comprises in particular a structure of toroidal or polygonal shape intended to be submerged and a counterweight intended to be submerged under the structure and connected thereto by retaining tendons.

This publication also describes several methods for installing an offshore wind turbine equipped with such a float. In some variant embodiments of such a method, the counterweight is lowered under the float until the retaining tendons are tensioned. In other embodiments of the installation method, it is on the contrary the float which is lifted relative to the counterweight until the retaining tendons are tensioned.

In these installation variants, it is necessary to overcome the problem of load distribution in the various retaining tendons of the counterweight. For example, when the float has a hexagonal shape connected by 6 retaining tendons to a counterweight weighing between 1500 and 3000 tons-force in the water and submerged several tens of meters under the float, each retaining tendon must statically resume the same tension, namely a little more than the $6^{th}$ of the suspended weight (due to the angle of attack of the retaining tendons which is not vertical).

The assembled system being very stiff and hyperstatic, the distribution of tension in the tendons is very sensitive to manufacturing tolerances. Indeed, a few centimeters of error are enough to over-stretch or relax a retaining tendon. However, this is not acceptable for the design of the float structure.

DISCLOSURE OF THE INVENTION

The aim of the present invention is therefore to propose a method for tensioning a hyperstatic system composed of two structures connected to each other by tendons which allows to guarantee that the forces calculated in the tendons are not exceeded during the lifting phase.

In accordance with the invention, this object is achieved by means of a method for tensioning a hyperstatic system comprising two structures connected to each other, the method successively comprising:

a step a) consisting of connecting, by means of at least one non-adjustable tendon and at least one adjustable tendon which is formed by a tendon coupled to a cylinder in an initially retracted position, an upper structure resting on an upper support to a lower structure which is positioned below the upper structure while maintaining zero tension in the tendons;

a step b) consisting of applying a force to the upper structure and/or the lower structure in order to tension each adjustable tendon and to deploy the respective cylinder thereof, the tension of each non-adjustable tendon remaining at zero; and a step c) consisting of progressively increasing the force on the upper structure and/or the lower structure until the tension of each non-adjustable tendon reaches a threshold value which brings about a load transfer from the lower structure to the upper structure so as to allow the lower structure to be supported by the upper structure.

The method according to the invention is remarkable in that it allows to distribute the load as calculated between the various retaining tendons in order to guarantee the correct tensions therein.

The method according to the invention also allows to overcome too strict manufacturing tolerance problems on the tendons but also on the upper and lower structures. It also allows to impose then control the tension in each tendon during lifting.

In addition, the method according to the invention allows not to oversize the elements in order to compensate for possible manufacturing errors, measurement errors or assembly uncertainties. It also allows to dispense with monitoring the tensions in the tendons insofar as it is possible to guarantee that after lifting, nothing will change over time.

The method may comprise an additional step e) consisting of locking the cylinder of each adjustable tendon in position. In this case, the method may comprise another additional step e) consisting of recovering the cylinder of each adjustable tendon.

Preferably, each adjustable tendon has, when its cylinder is in the retracted position, a minimum length which is less than the length of each non-adjustable tendon, and, when its cylinder is in the deployed position, a maximum length which is greater than that of each non-adjustable tendon.

Step a) can advantageously be carried out by means of at least three non-adjustable tendons so as to allow isostatic support of the lower structure, the threshold value of the non-adjustable tendons being a predefined value.

Step b) can be carried out by applying a lifting force to the upper structure relative to the lower structure, said upper structure taking off from its lower support as soon as the tension of the non-adjustable tendons reaches the threshold value during step c).

In this case, the lifting force of step b) can be applied by means of an external crane or by deballasting the upper structure which will have been initially submerged and ballasted.

Also in this case, the lower structure may initially rest on a fixed lower support which is formed by the seabed or by a fixed stool resting on the seabed.

Step b) can be carried out by applying a force for descending the lower structure under the upper structure.

In this case, the lower structure may initially rest on a movable lower support which is formed by a stool mounted on cylinders or by a submersible floating support structure or by an attachment system of a lifting crane.

The invention also relates to the application of the method as defined previously to the lifting of the structure of a float for an offshore wind turbine, in particular to the lifting of a hexagonal or octagonal structure of a float for an offshore wind turbine.

In this application, step a) is advantageously implemented by means of at most three non-adjustable tendons and at least three adjustable tendons, the threshold value of the non-adjustable tendons being a predefined value given by the equation: $T=W/(n\times\cos(a))$ where n is the total number of tendons, W is the total weight of the lower structure and all the tendons, and a is the angle of attack of the vertically adjustable tendons.

The invention also relates to a system for tensioning a hyperstatic system comprising two structures connected to each other, the system comprising:

at least one adjustable tendon which is formed by a tendon coupled to a cylinder and at least one non-adjustable tendon to connect an upper structure resting on an upper support to a lower structure which is positioned below the upper structure; and means for applying a force to the upper structure and/or the lower structure in order to tension the tendons.

The cylinder of each adjustable tendon can be a cylinder controlled at a predetermined pressure, preferably using a hydraulic unit or a large-volume pressure accumulator or a pressure limiter or a low-stiffness pre-loaded spring.

Each adjustable tendon may have, when its cylinder is in the retracted position, a minimum length which is less than the length of each non-adjustable tendon, and, when its cylinder is in the extended position, a maximum length which is greater than that of each non-adjustable tendon.

DESCRIPTION OF EMBODIMENTS

In general, the invention applies to the tensioning of any hyperstatic system comprising two structures connected to each other, and more specifically comprising an upper structure and a lower structure which is positioned below the upper structure.

FIGS. 1 to 6 schematically illustrate the different steps of the tensioning method according to the invention applied to a hyperstatic system 1 at least partly submerged at the sea.

Figure 1:
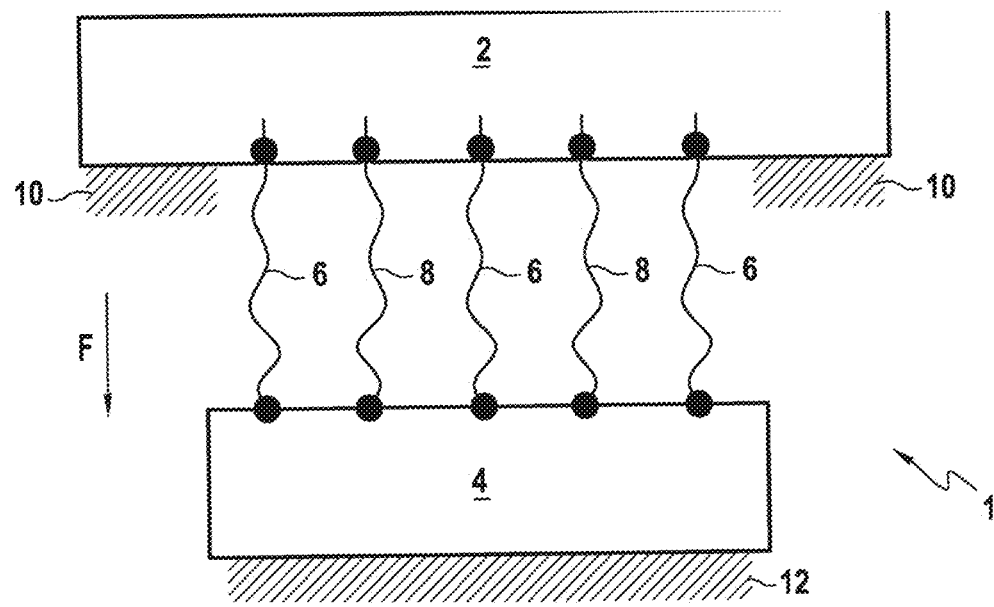
FIG. 1 is a schematic view of an example of an initial step of the tensioning method according to the invention.

FIG. 1 thus shows the initial step a) of the method consisting of connecting an upper structure 2 of the hyperstatic system 1 to a lower structure 4 of the hyperstatic system positioned below the upper structure by means of tendons 6, 8.

More specifically, in this step a), the upper structure 2 rests on an upper support 10 and the lower structure 4 can rest on a lower support 12, these supports possibly being fixed or movable.

In the case of a fixed support, the lower support 12 can for example be formed by the seabed or by a fixed stool resting on the seabed.

Alternatively, in the case of a movable support, the lower support 12 can for example be formed by a stool mounted on cylinders or by a submersible floating support structure or else by the attachment system of a lifting crane.

Still alternatively, the lower structure 4 does not rest on any support and has a variable weight (for example by ballasting or deballasting) in order to control its descent towards the seabed.

As for the upper support 10, when it is fixed, it can be formed by the simple buoyant force (the upper structure then being partially submerged and floating). When movable, this upper support can be formed by the attachment system of a lifting crane.

This initial step a) of the method is carried out by means of at least one non-adjustable tendon 6 and at least one adjustable tendon 8 (or "fixed" tendon) each connecting the lower structure 4 to the upper structure 2 (on the exemplary embodiment of FIG. 1, provision is made of three non-adjustable tendons 6 and two adjustable tendons 8).

Figure 2:
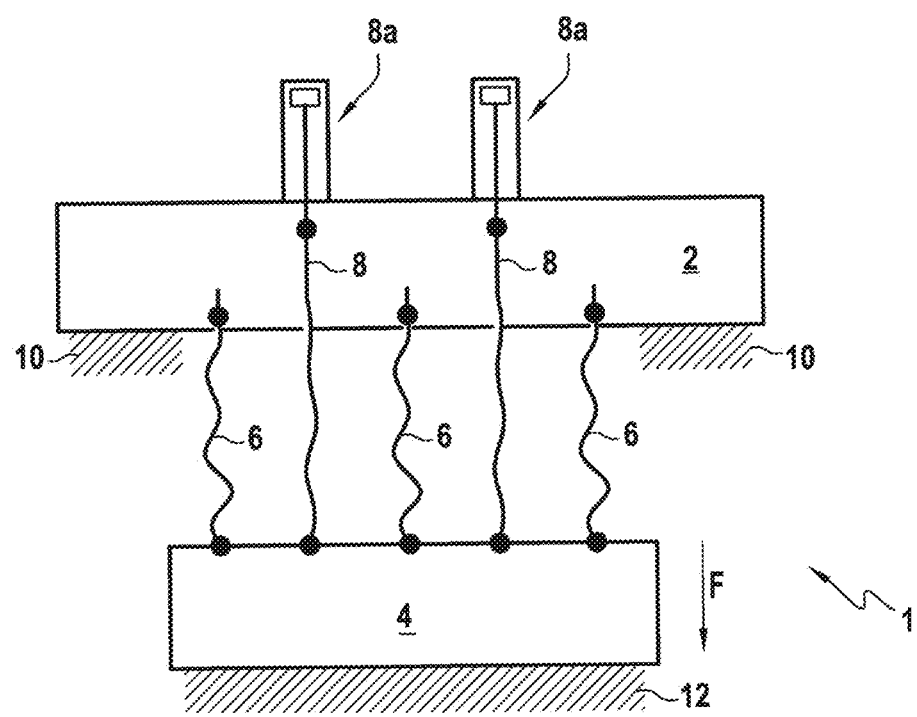
FIG. 2 schematically shows step a) consisting of connecting the upper structure to the lower structure which is positioned below the upper structure in accordance with the method according to the invention.
Figure 3:
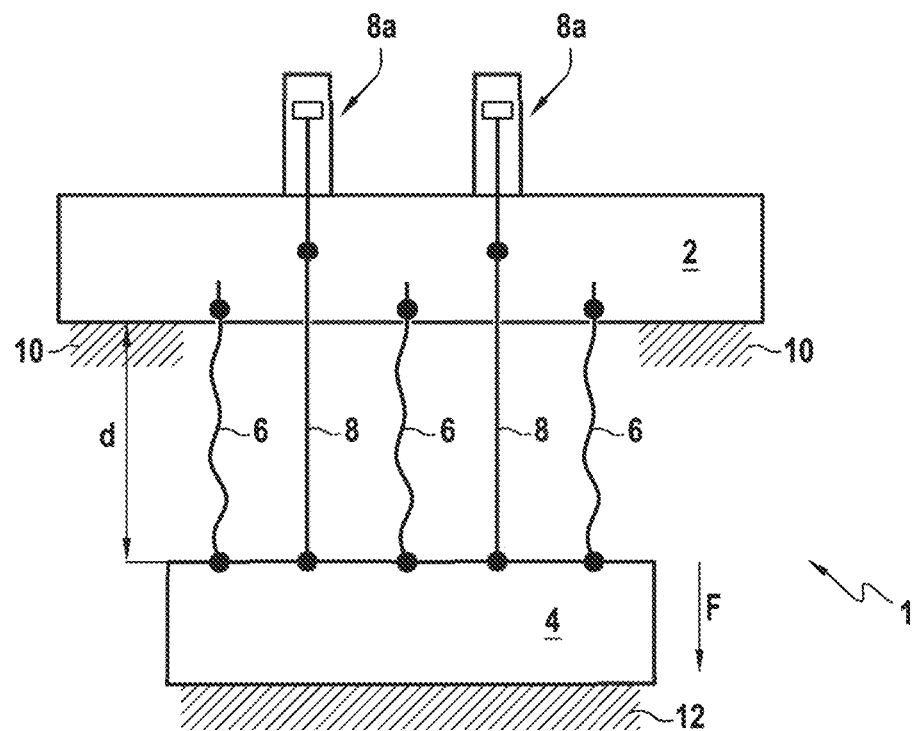
FIG. 3 schematically shows step b) consisting of applying a force to the upper structure and/or the lower structure in accordance with the method according to the invention.
Figure 4:
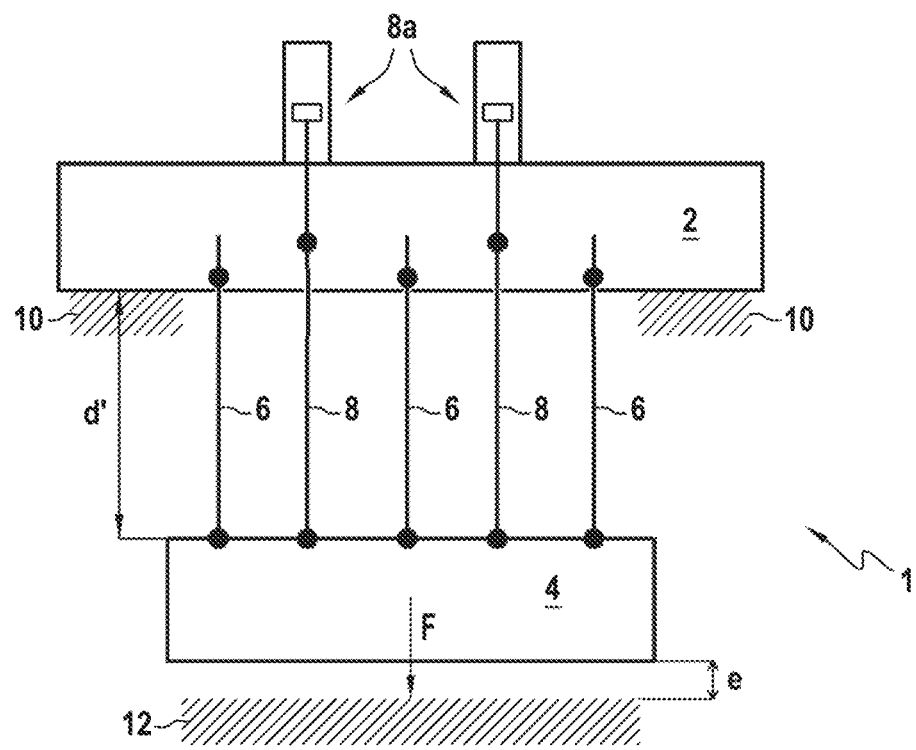
FIG. 4 schematically shows step c) consisting of progressively increasing the force on the upper structure and/or the lower structure in accordance with the method according to the invention.

During this step a) illustrated by FIG. 2, each adjustable tendon 8 is connected to the rod of a cylinder 8a assembled on the upper structure 2 to form an adjustable tendon within the meaning of the invention.

At this initial stage of the method, the non-adjustable tendons 6 and the adjustable tendons 8 are in a relaxed state (that is to say the tension of each tendon is zero). In addition, the cylinders 8a of the adjustable tendons abut in the retracted position.

The following step b) of the tensioning method according to the invention (see FIG. 3) consists of applying a force E to the upper structure 2 and/or the lower structure 4 in order to tension each adjustable tendon and to deploy the respective cylinder thereof, the tension of each non-adjustable tendon remaining at zero.

This force F consists of a force to move the structures 2, 4 away from each other, that is to say to increase the distance d which separates them.

This force F can thus consist of a force for lifting the upper structure 2 relative to the lower structure 4 (for example by means of an external lifting crane or by deballasting the upper structure which will have been initially submerged and ballasted).

Alternatively (or in addition), this force F can consist of a force for descending the lower structure 4 under the upper structure 2 (for example by lowering the lower structure by means of a stool mounted on cylinders or by a floating support submersible structure on which rests the lower structure).

During this step b), the adjustable tendons 8 are tensioned by this force F, and the rods of the cylinders 8a associated with these tendons are deployed. This step b) continues, preferably with constant force, as long as the tension in the non-adjustable tendons 6 remains zero.

During this step b), the lower structure 4 remains stationary on its lower support 12 because the resultant of the tensions of the adjustable tendons 8 is deliberately insufficient to lift it from its lower support.

The following step c) of the tensioning method according to the invention (see FIG. 4) consists of continuing to progressively increase the force on the upper structure and/or the lower structure until the tension of each non-adjustable tendon 6 reaches a threshold value which brings about a load transfer from the lower structure 4 to the upper structure 2.

More specifically, during this step c), the distance d' separating the upper structure 2 from the lower structure 4 further increases until the non-adjustable tendons 6 stretch and their tension reaches a threshold value.

At the end of this step c), a load transfer takes place from the lower structure 4 to the upper structure 2 so as to allow the lower structure to be supported by the upper structure.

In other words, the lower structure 4 is lifted from its lower support 12 (shown schematically by the distance e in FIG. 4) and is now entirely suspended from the upper structure 2.

In the particular case where the lower support 12 is an attachment system of a lifting crane or the lower structure does not rest on any support, then there is no detachment of the lower structure but a gradual and complete transfer of the tension from the lower support to the upper structure 2.

It should be noted that the tension in the adjustable tendons 8 is always imposed by the cylinders 8a at constant force, and the value of this tension is perfectly known and controlled.

Figure 5:
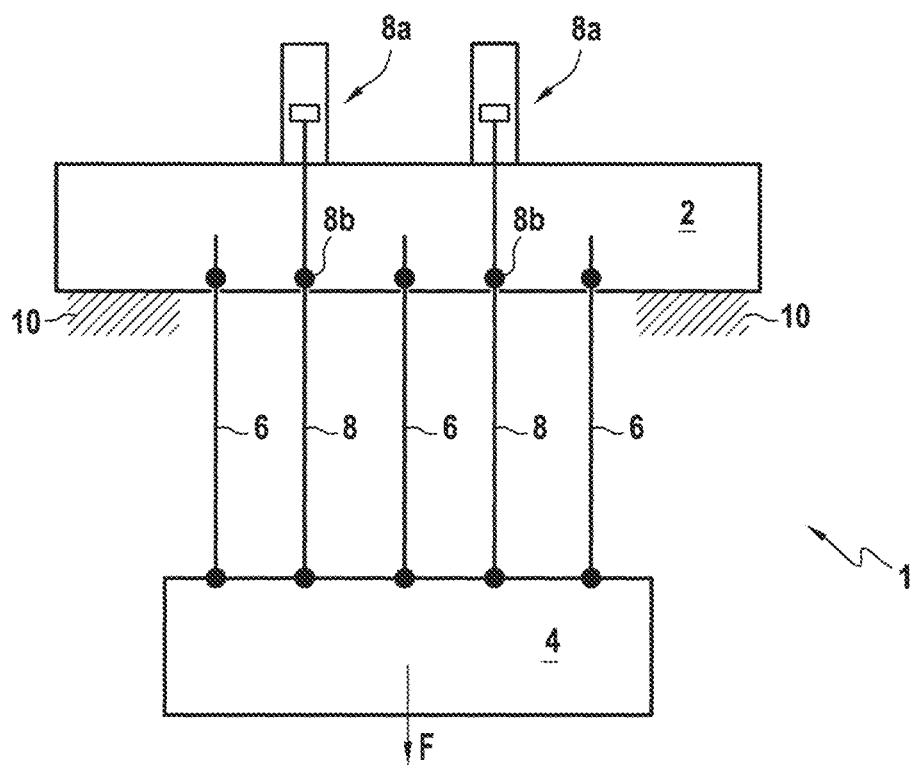
FIG. 5 schematically shows an additional step consisting of removing the upper structure and locking the adjustable tendons.
Figure 6:
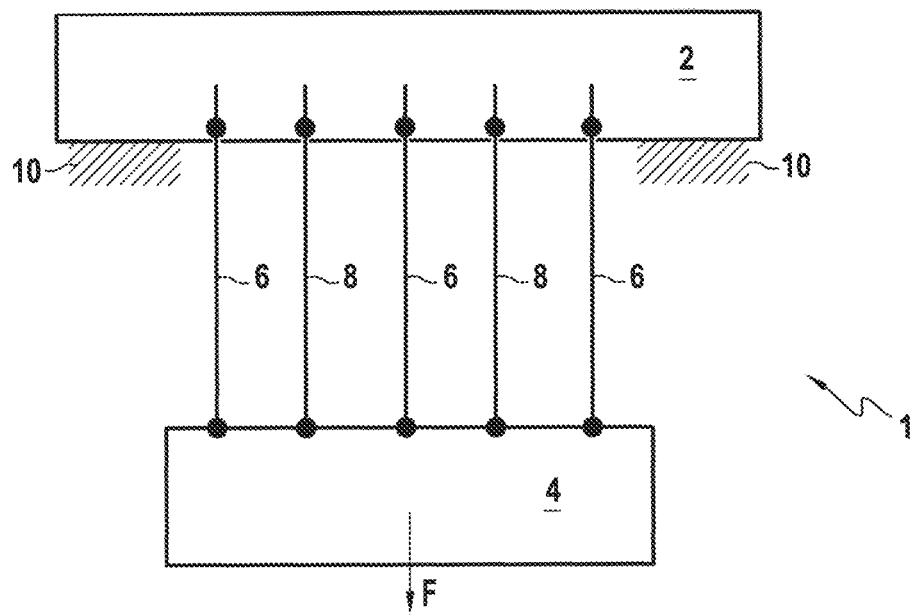
FIG. 6 schematically shows another additional step consisting then of recovering the cylinder of each adjustable tendon.

FIGS. 5 and 6 illustrate additional steps that can also be implemented.

Thus, during an additional step d) illustrated in FIG. 5, provision is made to lock the cylinder 8a of each adjustable tendon 8 in position.

For this purpose, the lower structure 4 remains suspended from the upper structure 2 (its lower support having been removed if necessary), while the upper structure rests on its upper support 10.

The upper end 8b of the adjustable tendons 8 is locked in position on the upper structure (operation during which the tension in the adjustable tendons does not vary). The cylinders 8a can then be depressurized, then disconnected from the adjustable tendons.

During the additional step e) illustrated by FIG. 6, the cylinders are then deposited and recovered.

It should be noted that the value of the tension in the non-adjustable tendons depends on several factors: arrangement of their point of connection on the lower structure in relation to the center of gravity thereof, number of non-adjustable tendons, and stiffness of the non-adjustable tendons.

In particular, if it is desired to know and control the tension in the non-adjustable tendons, it will be necessary to select a number and an arrangement of adjustable tendons such that the support of the lower structure by the non-adjustable tendons alone is isostatic.

However, it is perfectly possible to consider supporting the lower structure only by the non-adjustable tendons, which is hyperstatic, in particular to limit the number of cylinders.

In connection with FIGS. 7A to 7C, the application of the tensioning method according to the invention to the lifting of the structure of a float for an offshore wind turbine will now be described.

In this application example, the float structure is a hexagonal-shaped structure as described in detail in publication WO 2019/106283. Of course, this float structure could have another shape, which is in particular polygonal, such as for example an octagonal shape.

Figures 7A, 7B, 7C:
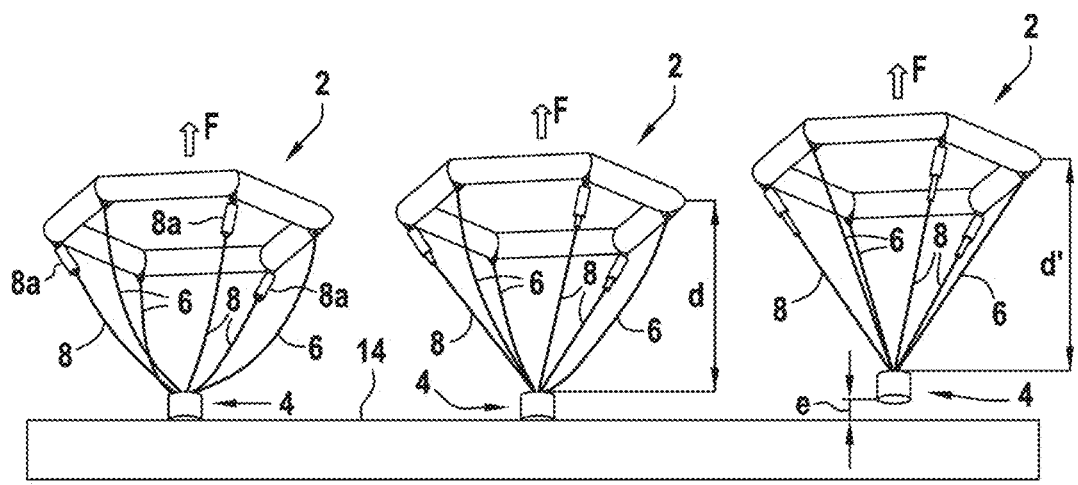
FIGS. 7A to 7C schematically show different steps of an example of application of the method according to the invention to the lifting of a hexagonal structure of a float for an offshore wind turbine.

As shown in FIG. 7A, during step a) of the tensioning method, the structure of the float 2 (that is to say upper structure) is partially submerged at the sea and is connected to a counterweight 4 (that is to say lower structure) positioned under the float structure.

In this initial step a), the counterweight 4 rests directly on the seabed 14 (which thus forms the lower support).

Moreover, the connection between the structure of the float and the counterweight is here made by means of three non-adjustable tendons 6 and three adjustable tendons 8 each connected to a cylinder 8a, the tendons 6, 8 each being connected to one of the vertices of the hexagon by alternating adjustable tendon/non-adjustable tendon.

Each adjustable tendon 8 here has the particularity of having, when its cylinder 8a is in the retracted position, a minimum length which is less than the length of each non-adjustable tendon 6, and, when its cylinder is in the deployed position, a maximum length which is greater than that of each non-adjustable tendon.

In addition, the presence of three non-adjustable tendons 8 allows to obtain isostatic support of the lower structure by the upper structure.

In this case, and as explained previously, it is possible to know and control the threshold value of the non-adjustable tendons, this value then being a predefined value given by the equation:

$$T = W/(n \times \cos(a))$$

where n is the total number of tendons 6, 8, W is the total weight of the counterweight 4 and all tendons, and a is the angle of attack of the vertically adjustable tendons.

Still in this application example, step b) of the tensioning method illustrated by FIG. 7B is carried out by applying a lifting force F to the float structure 2 relative to the counterweight 4 (for example by means of an external crane not shown in the figures).

During this step b), the distance d between the float structure 2 and the counterweight 4 increases and the tension of the non-adjustable tendons 6 remains zero.

During the following step c) (see FIG. 7C), the force on the float structure 2 is progressively increased until the tension of each non-adjustable tendon 6 reaches the predefined threshold value T mentioned above.

At the end of this step c), the distance d' between the float structure 2 and the counterweight 4 has increased further, and the counterweight has taken off from the seabed 14 (takeoff shown schematically by the distance e).

Alternatively, it will be noted that the lifting force of step b) can be applied by deballasting the float structure 2 which will have been initially submerged and ballasted.

Also alternatively, it will be noted that the lifting force of step b) could be applied by descending the counterweight 4 under the float structure 2, for example by activating a stool mounted on cylinders on which the counterweight initially rests or by a submersible floating support structure supporting the counterweight or else by a lifting crane or by varying the weight of the counterweight.

The invention claimed is:

1. A method for tensioning a hyperstatic system comprising two structures connected to each other, the method successively comprising:
   step a) consisting of connecting, by at least one non-adjustable tendon and at least one adjustable tendon which is formed by a tendon coupled to a cylinder in an initially retracted position, an upper structure resting on an upper support to a lower structure which is positioned below the upper structure while maintaining zero tension in the at least at least one adjustable tendon and the at least one non-adjustable tendon;
   step b) consisting of applying a force to the upper structure and/or the lower structure in order to tension each adjustable tendon and to deploy the respective cylinder thereof, the tension of each non-adjustable tendon remaining at zero; and
   step c) consisting of progressively increasing the force on the upper structure and/or the lower structure until the tension of each non-adjustable tendon reaches a threshold value which brings about a load transfer from the lower structure to the upper structure so as to allow the lower structure to be supported by the upper structure.

2. The method according to claim 1, comprising an additional step d) consisting of locking the cylinder of each adjustable tendon in position.

3. The method according to claim 2, comprising another additional step e) consisting of recovering the cylinder of each adjustable tendon.

4. The method according to claim 1, wherein each adjustable tendon has a minimum length in the initially retracted position, which is less than a length of each non-adjustable tendon, and a maximum length in a deployed position, which is greater than each non-adjustable tendon.

5. The method according to claim 1, wherein step a) is carried out by three non-adjustable tendons so as to allow isostatic support of the lower structure, the threshold value of the non-adjustable tendons being a predefined value.

6. The method according to claim 1, wherein step b) is carried out by applying a lifting force to the upper structure relative to the lower structure, said upper structure taking off from its lower support as soon as the tension of the non-adjustable tendons reaches the threshold value during step c).

7. The method according to claim 6, wherein the lifting force of step b) is applied by an external crane.

8. The method according to claim 6, wherein the lifting force of step b) is applied by deballasting the upper structure which will have been initially submerged and ballasted.

9. The method according to claim 6, wherein the lower structure initially rests on a fixed lower support which is formed by a seabed or by a fixed stool resting on the seabed.

10. The method according to claim 1, wherein step b) is carried out by applying a force for descending the lower structure under the upper structure.

11. The method according to claim 10, wherein the lower structure initially rests on a movable lower support which is formed by a stool mounted on the cylinder or by a submersible floating support structure or by an attachment system of a lifting crane.

12. An application of the method according to claim 1 comprising: lifting of the lower structure of a float for an offshore wind turbine by three non-adjustable tendons and at least three adjustable tendons.

13. The application according to claim 12, wherein the step of lifting of the structure includes lifting of a hexagonal or octagonal structure of the float for the offshore wind turbine, the threshold value of the non-adjustable tendons being a predefined value given by: $T=W/(n \times \cos(a))$ where n is a total number of tendons, W is a total weight of the lower structure and all tendons, and a is an angle of attack of the at least three adjustable tendons.

14. A system for tensioning a hyperstatic system comprising two structures connected to each other, the system comprising:
    at least one adjustable tendon formed by a tendon coupled to a cylinder; and
    at least one non-adjustable tendon to connect an upper structure resting on an upper support to a lower structure which is positioned below the upper structure and configured to rest on a fixed lower support formed by a seabed or by a fixed structure resting on the seabed; and
    means for applying a force to the upper structure and/or the lower structure to tension each non-adjustable tendon until tension of each non-adjustable tendon reaches a threshold value causing a load transfer from the lower structure to the upper structure;
    wherein the upper structure is configured to provide support for the lower structure, the lower structure being configured to be lifted from the fixed lower support and suspended by the upper structure at the load transfer.

15. The system according to claim 14, wherein the cylinder of each adjustable tendon is a cylinder controlled at a predetermined pressure using a hydraulic unit or a large-volume pressure accumulator or a pressure limiter or a low-stiffness pre-loaded spring.

16. The system according to claim 14, wherein each adjustable tendon has a minimum length in an initially retracted position, which is less than a length of each non-adjustable tendon, and a maximum length in a deployed position, which is greater than a maximum length of each non-adjustable tendon.

17. A method for tensioning a hyperstatic system comprising two structures connected to each other, the method comprising:
   step a) connecting, by at least one non-adjustable tendon and at least one adjustable tendon, an upper structure resting on an upper support to a lower structure positioned below the upper structure while maintaining zero tension in the at least at least one adjustable tendon and the at least one non-adjustable tendon;
   step b) applying a force to the upper structure and/or the lower structure in order to tension each adjustable tendon and to deploy respective cylinder of each adjustable tendon, the tension of each non-adjustable tendon remaining at zero; and
   step c) progressively increasing the force on the upper structure and/or the lower structure until the tension of each non-adjustable tendon reaches a threshold value which brings about a load transfer from the lower structure to the upper structure so as to allow the lower structure to be supported by the upper structure;
   wherein the at least one adjustable tendon is formed by a tendon coupled to a cylinder in an initially retracted position.

* * * * *